US010010234B2

(12) United States Patent
Luciano et al.

(10) Patent No.: US 10,010,234 B2
(45) Date of Patent: Jul. 3, 2018

(54) DIVERTER VALVE AND DISHWASHER WITH DIVERTER VALVE

(71) Applicant: WHIRLPOOL CORPORATION, Benton Harbor, MI (US)

(72) Inventors: Juan I. Luciano, Saint Joseph, MI (US); Antony M. Rappette, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 269 days.

(21) Appl. No.: 14/818,667

(22) Filed: Aug. 5, 2015

(65) Prior Publication Data

US 2017/0035265 A1 Feb. 9, 2017

(51) Int. Cl.
*A47L 15/42* (2006.01)
*F16K 11/065* (2006.01)

(52) U.S. Cl.
CPC ....... *A47L 15/4217* (2013.01); *A47L 15/4221* (2013.01); *A47L 15/4282* (2013.01); *F16K 11/0655* (2013.01)

(58) Field of Classification Search
CPC ............. A47L 15/4221; A47L 15/4206; A47L 15/4208; A47L 15/4225; A47L 15/4219
USPC ..... 134/56 D, 25.2, 111, 10, 18, 58 D, 57 D, 134/191, 108, 99.1, 178, 98.1; 137/625, 137/625.46, 563; 239/251, 245, 262, 61
See application file for complete search history.

(56) References Cited

U.S. PATENT DOCUMENTS 7,270,132 B2 * 9/2007 Inui ..................... A47L 15/4221 134/186
7,594,513 B2 9/2009 Vanderroest et al.
7,614,408 B2 * 11/2009 Park .................... A47L 15/4221 134/56 D
8,915,257 B2 * 12/2014 Busing ................ A47L 15/4221 134/191
9,737,191 B2 * 8/2017 Durham .............. A47L 15/4221
9,743,822 B2 * 8/2017 Boyer ................. A47L 15/4221
2003/0168087 A1 * 9/2003 Inui ..................... A47L 15/4221 134/57 D
2004/0173249 A1 * 9/2004 Assmann ............ A47L 15/4221 134/94.1
2004/0226586 A1 * 11/2004 Ertle ................... A47L 15/4221 134/57 D
2006/0054198 A1 * 3/2006 Choi ................... A47L 15/4204 134/56 D
2009/0159103 A1 * 6/2009 Gillum .................... A47L 15/14 134/98.1
2010/0078049 A1 * 4/2010 Assmann ............ A47L 15/4289 134/184

(Continued)

FOREIGN PATENT DOCUMENTS

EP 1767135 A1 3/2007

*Primary Examiner* — David G Cormier
*Assistant Examiner* — Thomas Bucci
(74) *Attorney, Agent, or Firm* — McGarry Bair PC

(57) ABSTRACT

A dishwasher for treating dishes according to an automatic cycle of operation and including a tub at least partially defining a treating chamber, at least one sprayer configured to emit a corresponding spray of liquid into the treating chamber, at least one liquid circuit supplying liquid to the at least one sprayer, a pump having a pump inlet fluidly coupled to the treating chamber and a pump outlet, and a diverter valve controlling a flow of liquid from the pump to the at least one sprayer.

20 Claims, 8 Drawing Sheets

(56) References Cited

U.S. PATENT DOCUMENTS

| | | | | |
|---|---|---|---|---|
| 2010/0236588 | A1* | 9/2010 | Busing | A47L 15/4221 134/184 |
| 2011/0088733 | A1* | 4/2011 | Busing | A47L 15/4221 134/198 |
| 2011/0114139 | A1* | 5/2011 | Buesing | A47L 15/4221 134/198 |
| 2012/0048313 | A1* | 3/2012 | Armstrong | A47L 15/4221 134/56 D |
| 2012/0266924 | A1* | 10/2012 | Boyer | A47L 15/4221 134/198 |
| 2013/0000762 | A1* | 1/2013 | Buddharaju | A47L 15/4221 137/605 |
| 2013/0074891 | A1 | 3/2013 | Bertsch et al. | |
| 2013/0319482 | A1* | 12/2013 | Vallejo Noriega | A47L 15/4285 134/99.1 |
| 2014/0069462 | A1* | 3/2014 | Becker | A47L 15/22 134/10 |
| 2014/0238447 | A1* | 8/2014 | Hofmann | A47L 15/4202 134/110 |
| 2014/0246059 | A1* | 9/2014 | Feddema | A47L 15/428 134/198 |
| 2014/0261560 | A1* | 9/2014 | Mealman | A47L 15/0052 134/25.2 |
| 2014/0373876 | A1* | 12/2014 | Feddema | A47L 15/4202 134/10 |
| 2015/0101644 | A1* | 4/2015 | Durham | A47L 15/4221 134/184 |

* cited by examiner

DIVERTER VALVE AND DISHWASHER WITH DIVERTER VALVE

BACKGROUND OF THE INVENTION

Contemporary automatic dishwashers for use in a typical household include a tub and at least one rack or basket for supporting soiled dishes within the tub. A spraying system can be provided for recirculating liquid throughout the tub to remove soils from the dishes. The spraying system can include various sprayers including a rotatable sprayer. A diverter valve in the form of a rotary disk is used to selectively supply liquid from a recirculation pump to the various sprayers.

SUMMARY

In one aspect, an embodiment of the invention relates to a dishwasher for treating dishes according to an automatic cycle of operation, including a tub at least partially defining a treating chamber, at least one sprayer configured to emit a corresponding spray of liquid into the treating chamber, at least one liquid circuit supplying liquid to the at least one sprayer, a pump having a pump inlet fluidly coupled to the treating chamber and a pump outlet, and a diverter valve having a plenum with a plenum inlet coupled to the pump outlet, at least one plenum outlet fluidly coupled to the at least one liquid circuit, and a membrane strip located within the plenum and having at least one control opening, wherein the membrane strip is movable in the plenum for movement along a path overlying the at least one plenum outlet such that the membrane strip can be selectively moved so as to selectively align the control opening with the at least one plenum outlet to selectively enable liquid flow from the plenum inlet through the at least one plenum outlet to control a flow of liquid from the pump to the at least one sprayer.

DESCRIPTION OF EMBODIMENTS OF THE INVENTION

Figure 1:
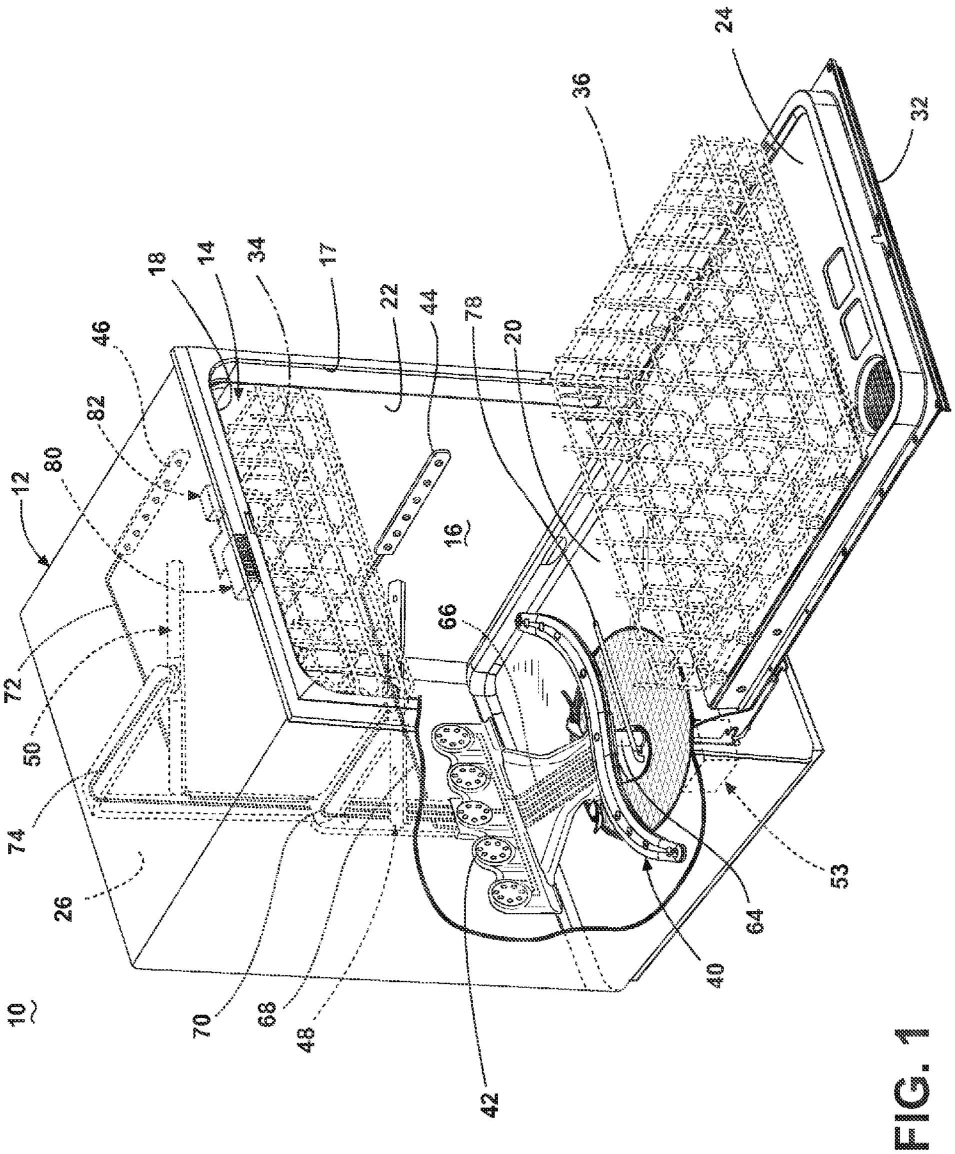
FIG. 1 is a perspective view of a dishwasher with a diverter valve according to an embodiment of the invention.

Referring to FIG. 1, an automatic dishwasher 10 having a cabinet 12 defining an interior is illustrated. Depending on whether the dishwasher 10 is a stand-alone or built-in, the cabinet 12 can be a chassis/frame with or without panels attached, respectively. The dishwasher 10 shares many features of a conventional automatic dishwasher, which will not be described in detail herein except as necessary for a complete understanding of the invention. While the present invention is described in terms of a conventional dishwashing unit, it could also be implemented in other types of dishwashing units, such as in-sink dishwashers, multi-tub dishwashers, or drawer-type dishwashers.

The cabinet 12 encloses a tub 14 at least partially defining a treating chamber 16 for holding dishes for washing according to a cycle of operation and defining an access opening 17. The tub 14 has spaced top and bottom walls 18 and 20, spaced sidewalls 22, a front wall 24, and a rear wall 26. In this configuration, the walls 18, 20, 22, 24, and 26 collectively define the treating chamber 16 for treating or washing dishes. The bottom wall 20 may have a front lip 28 (FIG. 2) with an upper portion 30 that may define a portion of the access opening 17. The front wall 24 may be at least partially defined by a door 32 of the dishwasher 10, which may be pivotally attached to the dishwasher 10 for providing accessibility to the treating chamber 16 through the access opening 17 for loading and unloading dishes or other washable items. More specifically, the door 32 may be configured to selectively open and close the access opening 17. Dish holders in the form of upper and lower dish racks 34, 36 are located within the treating chamber 16 and receive dishes for washing. The upper and lower racks 34, 36 may be mounted for slidable movement in and out of the treating chamber 16 for ease of loading and unloading. As used in this description, the term "dish(es)" is intended to be generic to any item, single or plural, that may be treated in the dishwasher 10, including, without limitation; utensils, plates, pots, bowls, pans, glassware, and silverware. While not shown, additional utensil holders, such as a silverware basket on the interior of the door 32 or on a sidewall 22, can also be provided.

Figure 2:
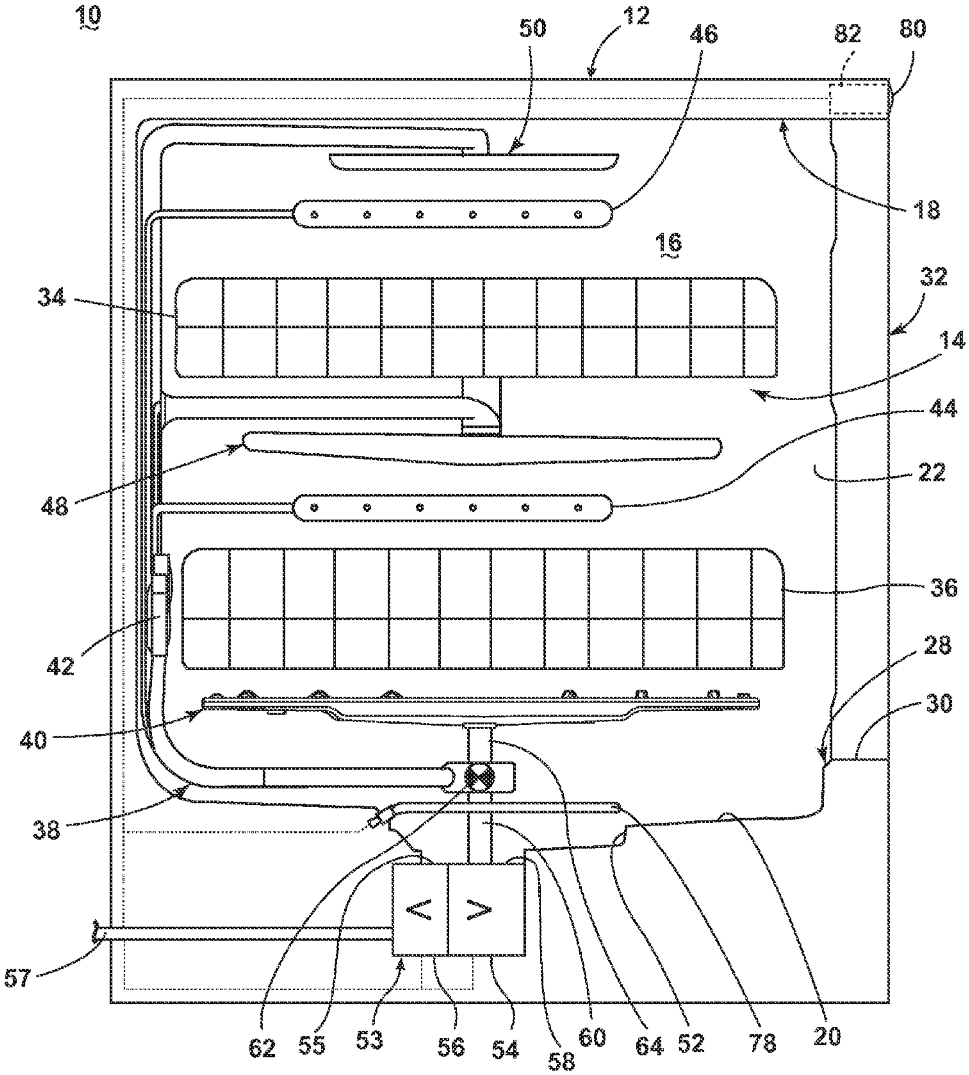
FIG. 2 is a partial schematic cross-sectional view of the dishwasher shown in FIG. 1.

Referring to FIG. 2, the major systems of the dishwasher 10 and their interrelationship may be seen. For example, a liquid recirculation system 38 is provided for spraying liquid within the treating chamber 16 to treat any dishes located therein. The liquid recirculation system 38 may include one or more sprayers configured to emit a corresponding spray of liquid into the treating chamber 16. In the exemplary illustration, there are six sprayers: a first lower spray assembly 40, a second lower spray assembly 42, a third lower spray assembly 44, a first mid-level spray assembly 46, a second mid-level spray assembly 48, and an upper spray assembly 50. While six sprayers have been illustrated it will be understood that any number of sprayers can be included in the dishwasher.

The first lower spray assembly 40 is positioned above the bottom wall 20 and beneath the lower dish rack 36. The first lower spray assembly 40 is an arm configured to rotate in the wash tub 14 and spray a flow of liquid from a plurality of spray nozzles or outlets, in a primarily upward direction, over a portion of the interior of the wash tub 14. A first wash zone may be defined by the spray field emitted by the first lower spray assembly 40 into the treating chamber 16. The spray from the first lower spray assembly 40 is sprayed into the wash tub 14 in typically upward fashion to wash dishes located in the lower dish rack 36. The first lower spray assembly 40 may optionally also provide a liquid spray downwardly onto a lower portion of the treating chamber 16, but for purposes of simplification, this will not be illustrated or described herein.

The second lower spray assembly 42 is illustrated as being located adjacent the lower rack 36 toward the rear of the treating chamber 16. The second lower spray assembly 42 is illustrated as including a horizontally oriented distribution header or spray manifold having a plurality of nozzles. The second lower spray assembly 42 may not be limited to this position; rather, the second lower spray assembly 42 could be located in virtually any part of the treating chamber 16. Alternatively, the second lower spray assembly 42 could be positioned underneath the lower rack 36, adjacent or beneath the first lower spray assembly 40. Such a spray manifold is set forth in detail in U.S. Pat. No. 7,594,513, issued Sep. 29, 2009, and titled "Multiple Wash Zone Dishwasher," which is incorporated herein by reference in its entirety. The second lower spray assembly 42 may be configured to spray a flow of treating liquid in a generally lateral direction, over a portion of the interior of the treating chamber 16. The spray may be typically directed to treat dishes located in the lower rack 36. A second wash zone may be defined by the spray field emitted by the second lower spray assembly 42 into the treating chamber 16. When both the first lower spray assembly 40 and the second lower spray assembly 42 emit spray fields the first and second zones may intersect.

The third lower spray assembly 44 can be similar to the second lower spray assembly 42 and has been illustrated as being located on a sidewall 22. The third lower spray assembly can be configured to spray a flow of treating liquid in an angled direction, over a portion of the interior of the treating chamber 16 including a portion of the lower rack 36. Again, the third lower spray assembly can be located in virtually any part of the treating chamber, can be shaped in any suitable manner, and its spray may be directed in any suitable direction.

The first mid-level spray assembly 46 has been illustrated similarly to the third lower spray assembly 44; however, it has been illustrated as being higher on the sidewall 22 such that it can emit a spray of liquid onto the upper dish rack 34. The first mid-level spray assembly 46 can be located in virtually any part of the treating chamber, can be shaped in any suitable manner, and its spray may be directed in any suitable direction.

The second mid-level spray arm assembly 48 is positioned between the upper dish rack 34 and the lower dish rack 36. Like the first lower spray assembly 40, the mid-level spray assembly 48 may also be configured to rotate in the dishwasher 10 and spray a flow of liquid in a generally upward direction, over a portion of the interior of the wash tub 14. In this case, the spray from the second mid-level spray arm assembly 48 is directed to dishes in the upper dish rack 34 to define a third spray zone. In contrast, the upper spray arm assembly 50 is positioned above the upper dish rack 34 and generally directs a spray of liquid in a generally downward direction to define a fourth spray zone that helps wash dishes on both upper and lower dish racks 34, 36.

A sump 52 and pump assembly 53 can be included in the liquid recirculation system 38. The sump 52 collects the liquid sprayed in the treating chamber 16 and can be formed by a sloped or recessed portion of a bottom wall 20 of the tub 14. The pump assembly 53 can include both a wash or recirculation pump 54 and a drain pump 56. The drain pump 56 can draw liquid from the sump 52 through a drain inlet 55 and pump the liquid out of the dishwasher 10 to a household drain line 57. The recirculation pump 54 can draw liquid from the sump 52 and pump the liquid to the one or more of the spray assemblies 40-50 to supply liquid into the treating chamber 16. While the pump assembly 53 is illustrated as having separate drain and recirculation pumps 54 and 56 in an alternative embodiment, the pump assembly 53 can include a single pump configured to selectively supply wash liquid to either the spray assemblies 40-50 or the drain line 57, such as by configuring the pump to rotate in opposite directions, or by providing a suitable valve system. While not shown, a liquid supply system can include a water supply conduit coupled with a household water supply for supplying water to the sump 52.

As shown herein, the recirculation pump 54 has a pump inlet 58 fluidly coupled to the treating chamber 16 via the sump 52 and a pump outlet 60 in fluid communication with a diverter valve 62. A number of liquid conduits 64, 66, 68, 70, 72, and 74 in turn fluidly couple the diverter valve 62 to the spray assemblies 40-50, respectively. In this manner, the pump outlet 60 is fluidly coupled to the spray assemblies 40-50 for discharging wash liquid from the recirculation pump 54 to the spray assemblies 40-50. As illustrated, liquid can be supplied to the spray assemblies 42-50 through liquid conduits 66, 68, 70, 72, and 74 that extend generally rearward from the recirculation pump 54 and upwardly along a rear wall of the tub 14. Liquid can be supplied to the spray assembly 40 through the liquid conduit 64.

The diverter valve 62 can control the flow of liquid within the dishwasher 10. While the diverter valve 62 has been illustrated as being located in the middle of the tub 14 it will be understood that the diverter valve 62 can be located in any suitable location. By way of further non-limiting example, the diverter valve 62 as described herein has a low profile, which allows for it to be located at the rear of the tub 14.

Liquid may be selectively supplied to a subset of all of the sprayers, including to only a singer sprayer, and/or simultaneously to all of the sprayers. The sump 52, recirculation pump 54, spray assemblies 40-50, and liquid conduits 64-74 collectively form a recirculation flow path in the liquid recirculation system 38. It will be understood that the recirculation flow path includes multiple recirculation circuits, with each circuit coupled to at least one of the sprayers forming the spray assemblies 40-50. The recirculation pump 54 may be fluidly coupled to one or more of the circuits such that it draws liquid in through the pump inlet 58 and sump 52 and delivers it to one or more of the spray assemblies 40-50 through the liquid conduits 64-74 depending on the operation of the diverter valve 62. The liquid is sprayed back into the treating chamber 16 through the spray assemblies 40-50 and drains back to the sump 52 where the process may be repeated.

A heating system having a heater 78 can be located within or near the sump 52 for heating liquid contained in the sump 52. A filtering system (not shown) can be fluidly coupled with the recirculation flow path for filtering the recirculated liquid.

A control panel or user interface 80 provided on the dishwasher 10 and coupled to a controller 82 may be used to select a cycle of operation. The user interface 80 may be provided on the cabinet 12 or on the outer panel of the door 32 and can include operational controls such as dials, lights, switches, and displays enabling a user to input commands to the controller 82 and receive information about the selected cycle of operation. The dishwasher 10 may further include other conventional components such as additional valves, a dispensing system for dispensing treating chemistries or rinse aids, spray arms or nozzles, etc.; however, these components are not germane to the present invention and will not be described further herein.

Figure 3:
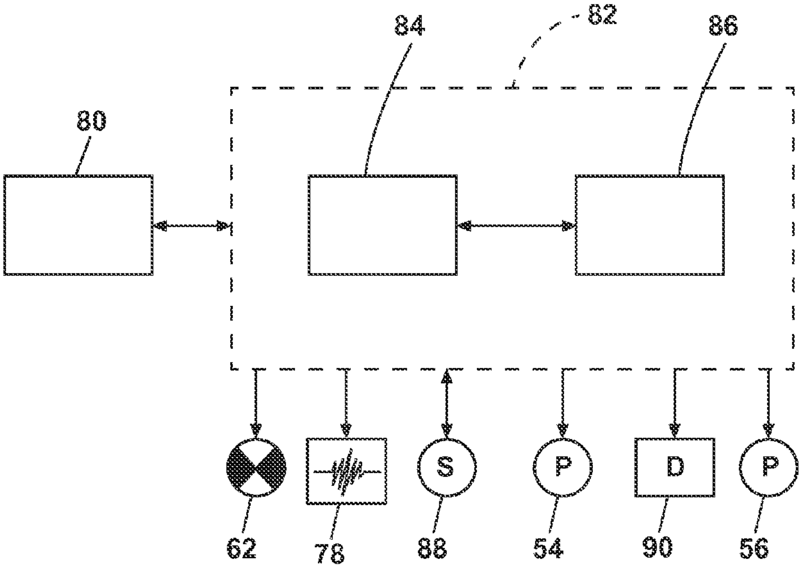
FIG. 3 is a schematic view of a control system of the dishwasher of FIG. 1.

As illustrated in FIG. 3, the controller 82 may be provided with a memory 84 and a central processing unit (CPU) 86. The memory 84 may be used for storing control software that may be executed by the CPU 86 in completing a cycle of operation using the dishwasher 10 and any additional software. For example, the memory 84 may store one or more pre-programmed cycles of operation that may be selected by a user and completed by the dishwasher 10. The controller 82 may be operably coupled with one or more components of the dishwasher 10 for communicating with and controlling the operation of the components to complete a cycle of operation. For example, the controller 82 may be coupled with the recirculation pump 54 and the diverter valve 62 for circulation of liquid in the wash tub 14 and the drain pump 56 for drainage of liquid in the wash tub 14. Further, the controller 82 may also be coupled with one or more temperature sensors 88, which are known in the art and not shown for simplicity, such that the controller 82 may control the duration of the steps of the cycle of operation based upon the temperature detected. The controller 82 may also receive inputs from one or more other optional sensor, which are known in the art and not shown for simplicity. The controller 82 may also be coupled to a dispenser 90, which may dispense a detergent during the wash step of the cycle of operation or a rinse aid during the rinse step of the cycle of operation.

Figure 4:
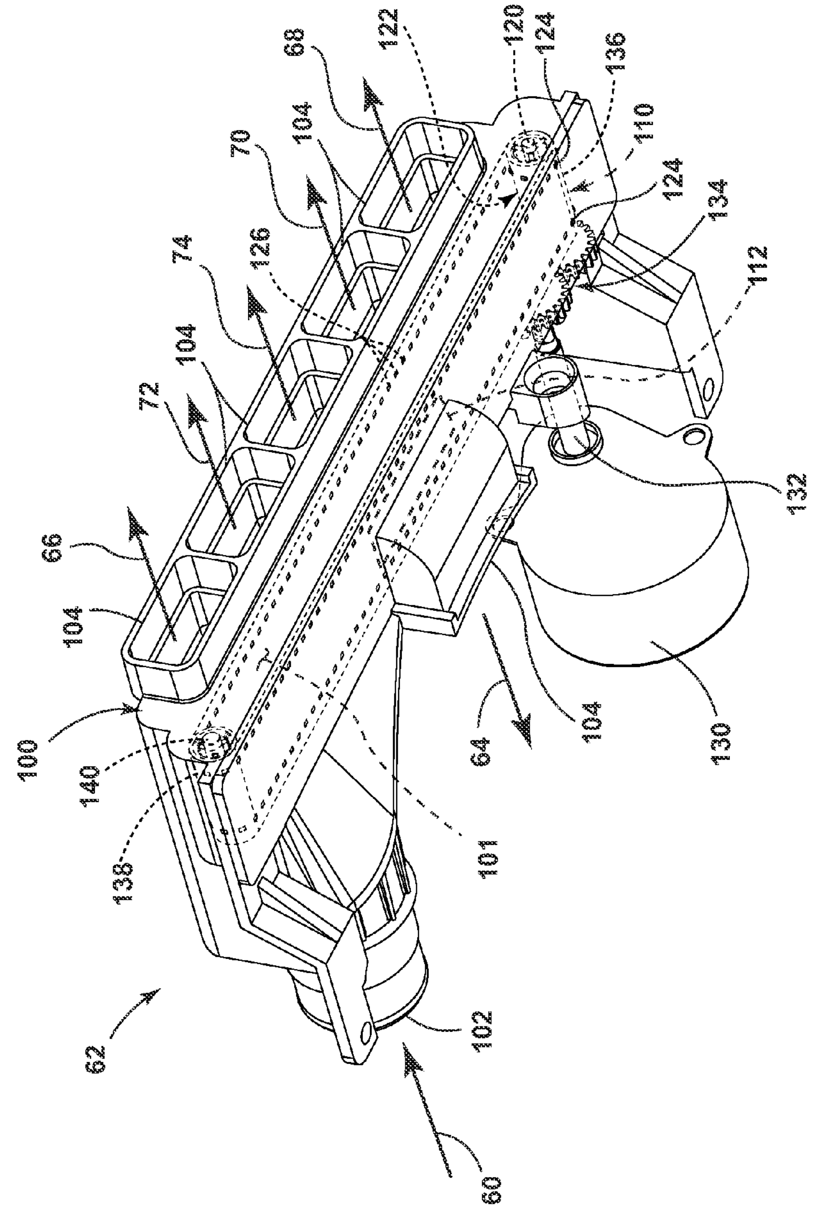
FIG. 4 is a perspective view of an exemplary diverter valve that can be utilized in the dishwasher of FIG. 1.
Figure 5:
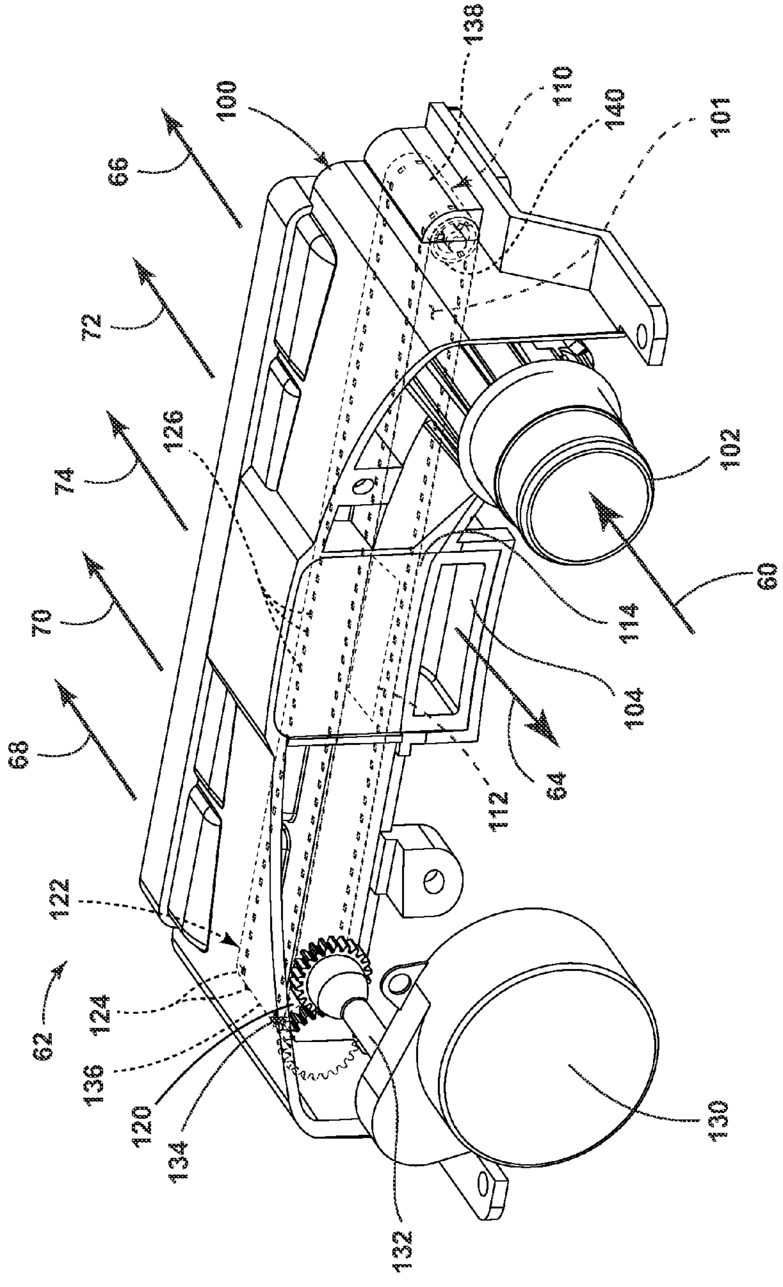
FIG. 5 is an alternative perspective view of the exemplary diverter valve of FIG. 4.

FIG. 4 illustrates an example of a diverter valve 62 having a housing 100 defining a plenum 101 and having a plenum inlet 102 and a plurality of plenum outputs 104. The plenum inlet 102 can be fluidly coupled to the pump outlet 60 of the recirculation pump 54, which has been schematically illustrated as an arrow 60. Each of the plenum outlets 104 fluidly couples to the liquid conduits 64, 66, 68, 70, 72, and 74, which have been schematically illustrated as arrows. While the liquid conduit 64 has been illustrated on one side of the housing 100 and the other liquid conduits 66-74 have been illustrated on another side as better illustrated in FIG. 5, it will be understood that the housing 100, plenum inlet 102, and plenum outlets 104 can be arranged in any suitable manner. It is contemplated that the number of plenum outlets 104 can correspond to the number of spray assemblies 40-50. Alternatively, the plenum outlet(s) 104 can be fluidly coupled to a liquid circuit that can lead to more than one spray assembly and has additional conduits and valving to control the flow thereto.

A valve body in the form of a membrane strip 110 can be located within the plenum 101 and have at least one control opening 112. The membrane strip 110 can abut portions of the housing 100 to form a liquid seal between the plenum outlets 104 and the remainder of the plenum 101. More specifically, the membrane strip 110 can abut an interior surface 114 (FIG. 7) of the housing 100. The membrane strip 110 is movable in the plenum 101 for movement along a path overlying the plurality of plenum outlets 104 such that the membrane strip 110 can be operable to selectively fluidly couple one of the plurality of plenum outlets 104 to a remainder of the plenum 101 and liquid therein. Movement of the membrane strip 110 can align the control opening 112 with one of the plenum outlets 104 while blocking at least another of the plenum outlets 104. The membrane strip 110 can be moveable to any number of positions such that different plenum outlets 104 can be fluidly coupled to the plenum 101. In this way, the different spray assemblies 40-50 may be selected to be fluidly coupled to the recirculation pump 54 with the movement of the membrane strip 110.

Figure 6:
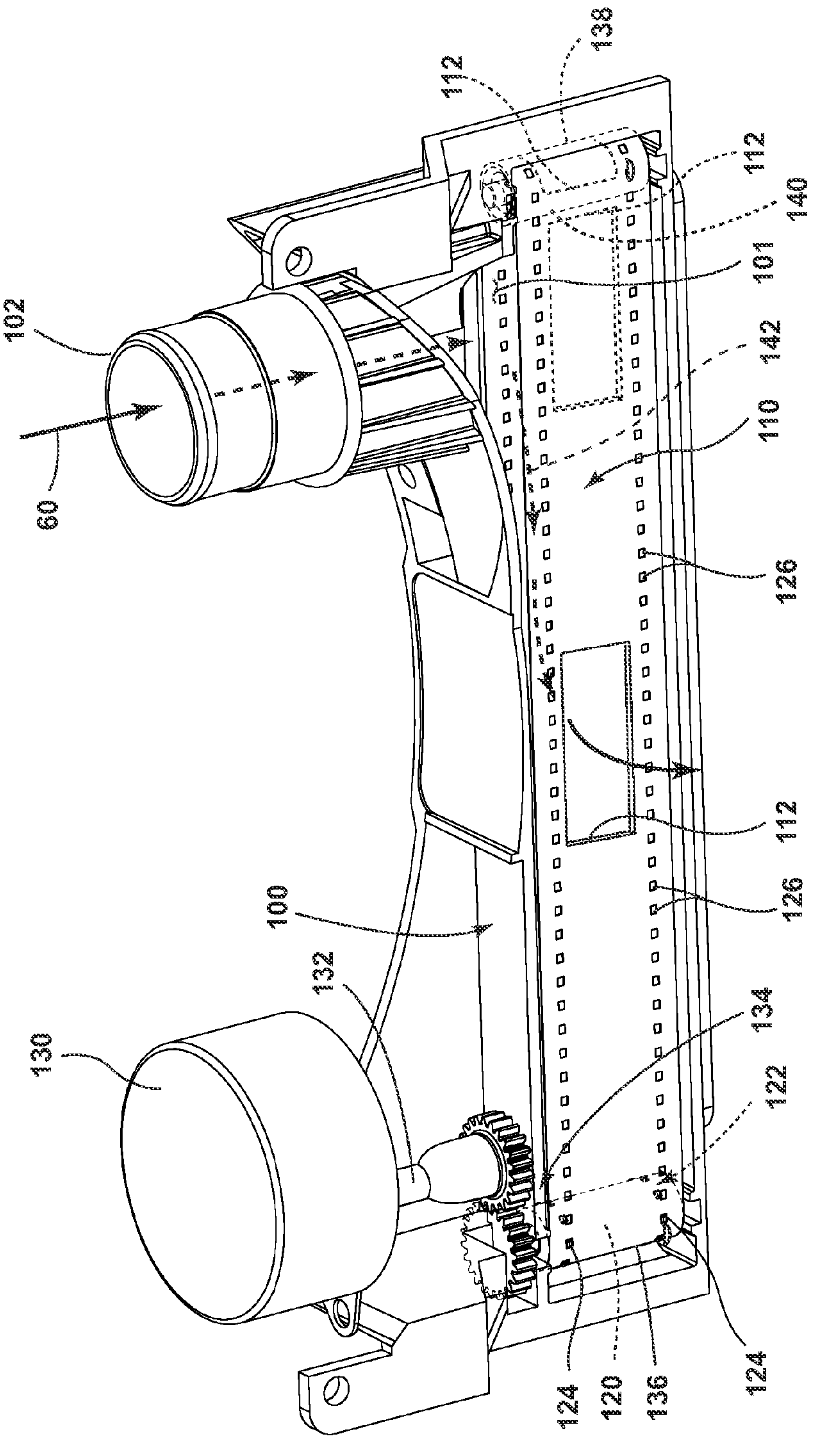
FIG. 6 is a bottom perspective view of the exemplary diverter valve of FIG. 4 with a portion of the housing removed for clarity.

A spool 120 is illustrated in FIG. 6 and can be configured to hold the membrane strip 110 in place and aid in driving the membrane strip 110. While not illustrated, the membrane strip 110 can be a segment that is wound or unwound about the spool 120 during movement of the membrane strip 110. The segment of the membrane strip 110 can be wound or unwound as needed such that movement of the membrane strip 110 aligns one or more control openings 112 with select plenum outlets 104.

It is contemplated that any number of spools can be included within the diverter valve 62 to hold the membrane strip 110 in place and aid in driving the membrane strip 110. In the illustrated example, the membrane strip 110 includes a looped membrane strip formed from a continuous band. The membrane strip 110 runs along the plenum outlets 104 and is held in place by a set of spools 120, 140. The spools 120, 140 are spaced apart from each other and the plenum outlets 104 lie between the two spools 120, 140. The continuous membrane strip 110 can have opposing ends 136, 138 with each end 136, 138 supported about a corresponding spool 120, 140, respectively.

The membrane strip 110 can be moveable utilizing any suitable driver or actuator. For example, one of the two spools 120, 140 can be driven externally to provide the rotation of the membrane strip 110. A drive including, but not limited to, a drive motor 130 can be operably coupled to the membrane strip 110 to move the membrane strip 110 within the plenum 101. By way of non-limiting example, the drive motor 130 has been illustrated as including an output shaft 132 that is operably coupled to the spool 120 to provide a driving force that turns the membrane strip 110. It is contemplated that the drive motor 130 can be a reversible drive motor and can be operably coupled to the controller 82 or another suitable controller. The controller 82 can control the operation of the drive motor 130 such that the membrane strip 110 can be driven in either a clockwise or counter-clockwise direction. In this manner the motor 130 can move the membrane strip 110 between any number of positions to fluidly couple any of the plenum outlets 104. A sensor (not shown) can be included in the dishwasher 10 including, but not limited to, that the sensor can be coupled with the diverter valve 62 to determine what plenum outlet 104 is fluidly coupled to the recirculation pump 54. Thus, if the position of the control opening 112 is somehow lost by the controller 82, the controller 82 can utilize the output from the sensor to determine the position of the control opening 112 and can control the movement of the membrane strip 110 based thereon.

The friction between the spool 120 and the membrane strip 110 may not be substantial enough to ensure rotation of the membrane strip 110. Thus, a sprocket 122 having teeth 124 can be included on the spool 120. The membrane strip 110 includes holes 126 that mesh with the teeth 124 of the sprocket 122 and the contact between the teeth 124 and the holes 126 aids in driving the membrane strip 110.

An optional gear train 134 has been illustrated as operably coupling the output shaft 132 to the spool 120 such that rotation of the output shaft 132 moves the gear train 134, which in turn rotates the spool and moves the membrane strip 110 to any number of positions. The gear train 134 can be formed in any suitable manner including, but not limited to, that the gear train 134 can be a speed increasing gear train where the sprocket 122 is driven faster than the rotation of the shaft 132. The gear ratios of the gear train 134 can be selected in any suitable manner to control the movement of the membrane strip 110 based on the rotation of the shaft 132.

In the illustrated example, the membrane strip 110 has a control opening 112 in it that is aligned such that one of the bank of plenum outlets 104 is fluidly coupled at a time, such that liquid is provided to one of the spray assemblies 40-50 at a time. Illustrated in phantom are additional multiple control openings 112. The use of additional multiple control openings 112, including control openings 112 spaced closely together can allow multiple spray assemblies 40-50 to be fluidly coupled to the recirculation pump 54 simultaneously. Alternatively, the use of multiple control openings 112 can be utilized to vary the sequencing of the fluidly coupled spray assemblies 40-50 depending on the location of the control openings 112 and the plenum outlets 104 in the housing 100. It is also contemplated that the membrane strip 110 can include various sets of control openings 112 and the various sets of control openings 112 can define different liquid diversion or spray configurations or can be utilized for the same diversion configurations but allow for them to cycle through the path more frequently.

In this manner it will be understood that the membrane strip 110 can have different sets of openings for different functionalities or different phases of the wash cycle. By way of non-limiting example, a different set of control openings 112 could be provided for each selectable wash cycle, phase, or option. For example, a set of control openings 112 that are only supplied to the upper rack sprayers can be included for when a user selects an option to only wash in the upper rack 34. In this manner, a user can pick a zone or rack for washing and only those zones or rack would be sprayed. Alternatively, if a concentrated wash was selected, during one part of the cycle the second lower spray assembly 42 could be solely supplied to clean the dishes in the lower rack 36.

Figure 8:
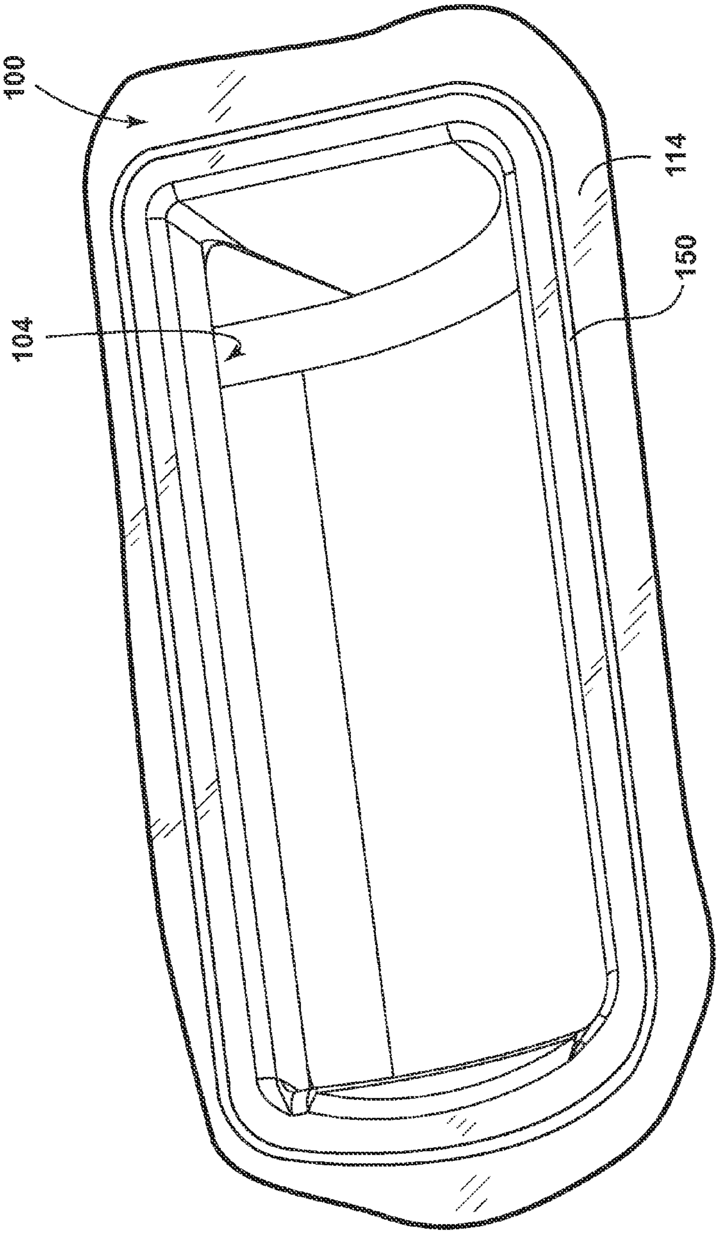
FIG. 8 is a perspective view of a plenum outlet that can be utilized in the exemplary diverter valve of FIG. 4.

FIG. 8 illustrates that an optional sealing ring 150 can be provided along the interior surface 114 of the housing 100, with the sealing ring 150 surrounding the plenum outlet 104. A sealing ring 150 can be provided around each of the plenum outlets 104. The sealing ring 150 can be a raised ring surrounding the plenum outlet 104 and can take any suitable form including that of an O-ring or other seal. Further, the sealing ring 150 can merely be a rib formed on an interior surface 114 of the housing 100. In essence, the sealing ring 150 forms a peripheral ridge, which spaces the membrane strip 110 from a remainder of the interior surface 114 to reduce friction. The membrane strip 110 can be capable of sealing against the interior surface 114 of the housing 100 and/or the sealing ring(s) 150 to better seal the plenum outlets 104 against the unintended flow of liquid from the remainder of the plenum 101. Thus, the plenum outlets 104 can be sealed such that liquid does not leak from the plenum 101 to the plenum outlets 104 that are not intentionally being fluidly coupled with the plenum 101. Sealing challenges can occur for various reasons including because the surface forming the interior surface 114 of the housing 100 is too rough or uneven. The sealing ring(s) 150 provide a smaller sealing surface for the membrane strip 110 allowing a greater force to be applied to those points, which allows for a better seal. The membrane strip 110 can be formed from any suitable material including, but not limited to, a mylar membrane. It is contemplated that the membrane strip 110 can be flexible and such flex can allow the membrane strip 110 to form around the sealing ring 150 and provide a robust seal.

Such a sealing ring 150 can also allow the control opening 112 to fluidly couple with the plenum outlet 104 so long as the control opening 112 is at least partially within the sealing ring 150. In this manner, the sealing ring 150 creates a larger effective outlet and allows for a longer fluid communication between the plenum outlet 104 having the sealing ring 150 and the control opening 112 in the membrane strip 110. Such sealing rings are set forth in detail in application Ser. No. 13/570,511, filed Aug. 9, 2012, now U.S. Pat. No. 9,492,055, and titled "Dishwasher with Spray System," which is incorporated herein by reference in its entirety.

The operation of the dishwasher 10 with the diverter valve 62 as illustrated will now be described. The user will initially select a cycle of operation via the user interface 80, with the cycle of operation being implemented by the controller 82 controlling various components of the dishwasher 10 to implement the selected cycle of operation in the treating chamber 16. Examples of cycles of operation include normal, light/china, heavy/pots and pans, and rinse only. The cycles of operation can include one or more of the following phases: a wash phase, a rinse phase, and a drying phase. The wash phase can further include a pre-wash phase and a main wash phase. The rinse phase can also include multiple phases such as one or more additional rinsing phases performed in addition to a first rinsing. During such cycles, wash fluid, such as water and/or treating chemistry (i.e., water and/or detergents, enzymes, surfactants, and other cleaning or conditioning chemistry) passes from the recirculation pump 54 into the liquid recirculation system 38 and then exits through the spray assemblies 40-50.

During the cycle of operation the recirculation pump 54 can be operated to recirculate liquid to one or more of the spray assemblies 40-50. To fluidly couple the one or more of the spray assemblies 40-50 with the output of the recirculation pump 54, the membrane strip 110 can be selectively moved so as to selectively align the control opening(s) 112 with one or more of plenum outlets 104 to selectively enable liquid flow from the plenum 101 through the one or more plenum outlets 104 to control a flow of liquid from the recirculation pump 54 to the one of the spray assemblies 40-50. FIG. 6 illustrates the membrane strip 110 having the control opening 112 in a position where the recirculation pump 54 via the diverter valve 62 is fluidly coupled with a plenum outlet 104, which leads to the liquid conduit 64. A flow of fluid is schematically illustrated with arrows 142. Fluid enters the plenum inlet 102 from the pump outlet 60 and flows into the plenum 101. The fluid then flows through the control opening 112 and out the plenum outlet 104. In this manner, the output from the recirculation pump 54 is fluidly coupled to the first lower spray assembly 40 via the diverter valve 62.

Figure 7:
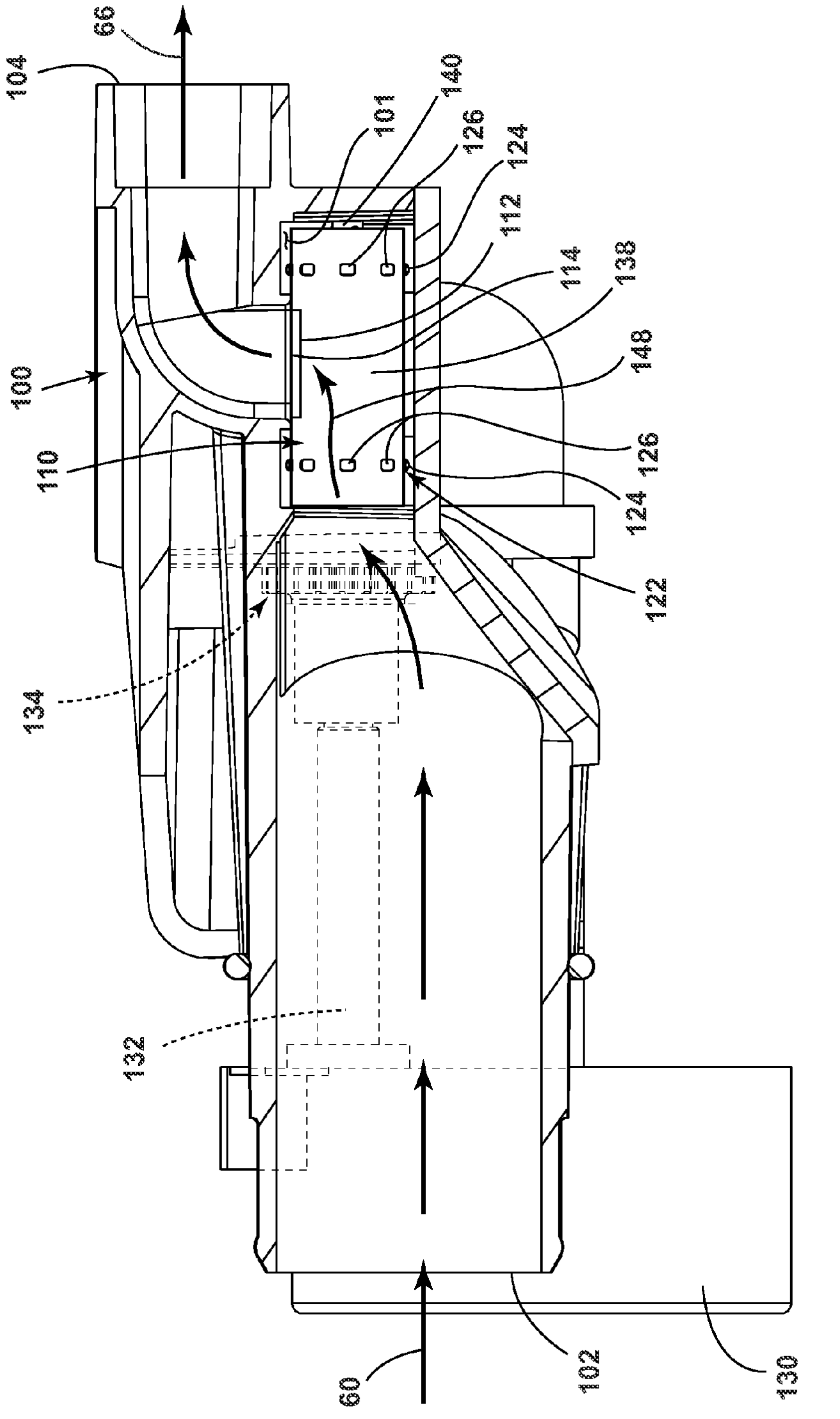
FIG. 7 is a cross-sectional view of the exemplary diverter valve with the valve body moved to fluidly couple an alternative plenum outlet.

The drive motor 130 can then be operated, including via the controller 82, to provide a driving force that turns the sprocket 122 and causes movement of the membrane strip 110 and the control opening 112 to a different position so that a different spray assembly can be fluidly coupled with the recirculation pump 54. By way of further non-limiting example, FIG. 7 illustrates the control opening 112 moved to fluidly couple with an alternative plenum outlet 104. More specifically, the control opening 112 is illustrated as fluidly coupling to the plenum outlet 104 that is fluidly coupled with the liquid conduit 66. A flow of fluid is schematically illustrated with arrows 148. Fluid enters the plenum inlet 102 from the pump outlet 60 and flows into the plenum 101. The fluid then flows through the control opening 112 and out the plenum outlet 104. In this manner, the output from the recirculation pump 54 is fluidly coupled to the second lower spray assembly 42 via the diverter valve 62.

The above-described embodiments provide a variety of benefits including that a diverter valve can be utilized to fluidly couple a pump outlet to any number of spray assemblies while fluidly sealing off other spray assemblies. Unlike current diverter valves the above-described embodiments are easy to control, allow for a large number of fluidly couplings, properly seal off other outlets, and have less flow restrictions and bends. The above-described diverter valve embodiments also utilize space efficiently and are low profile and thus can be placed in various places including at the back of the tub, which can eliminate multiple elbows the fluid must pass through and significantly decreases head.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure. Further, while the invention has been specifically described in connection with certain specific embodiments thereof, it is to be understood that this is by way of illustration and not of limitation.

The patentable scope of the invention is defined by the claims, and can include other examples that occur to those skilled in the art. It will be understood that any features of the above-described embodiments can be combined in any manner. Reasonable variation and modification are possible within the scope of the forgoing disclosure and drawings without departing from the spirit of the invention, which is defined in the appended claims.

What is claimed is:

1. A dishwasher for treating dishes according to an automatic cycle of operation, comprising:

a tub at least partially defining a treating chamber;

at least one sprayer configured to emit a corresponding spray of liquid into the treating chamber;

at least one liquid circuit supplying liquid to the at least one sprayer;

a pump having a pump inlet fluidly coupled to the treating chamber and a pump outlet; and a diverter valve having a plenum with a plenum inlet coupled to the pump outlet, at least one plenum outlet fluidly coupled to the at least one liquid circuit, and a membrane strip located within the plenum and having at least one control opening and having at least one spool configured to hold the membrane strip in place and aid in driving the membrane strip; and wherein the membrane strip is movable in the plenum for movement along a path overlying the at least one plenum outlet such that the membrane strip can be selectively moved so as to selectively align the at least one control opening with the at least one plenum outlet to selectively enable liquid flow from the plenum inlet through the at least one plenum outlet to control a flow of liquid from the pump to the at least one sprayer.

2. The dishwasher of claim 1 wherein there are multiple sprayers, with corresponding liquid circuits, and corresponding plenum outlets, wherein movement of the membrane strip aligns the at least one control opening with at least one of the plenum outlets while blocking at least another of the plenum outlets.

3. The dishwasher of claim 2 wherein there are multiple control openings, wherein movement of the membrane strip aligns the multiple control openings with different plenum outlets while blocking at least another of the plenum outlets.

4. The dishwasher of claim 3 wherein the membrane strip comprises sets of control openings.

5. The dishwasher of claim 4 wherein the sets of control openings define different spray configurations.

6. The dishwasher of claim 1 wherein the membrane strip is wound or unwound about the at least one spool during movement of the membrane strip.

7. The dishwasher of claim 6 wherein the at least one spool comprises a sprocket and the membrane strip comprises holes that receive the sprocket.

8. The dishwasher of claim 6, further comprising a drive motor having an output shaft operably coupled to the at least one spool.

9. The dishwasher of claim 1 wherein the at least one spool comprises at least two spools, with the membrane strip being continuous and having opposing ends and each end supported about a corresponding one of the at least two spools.

10. The dishwasher of claim 9 wherein the at least two spools are spaced from each other.

11. The dishwasher of claim 10 wherein there are multiple plenum outlets and at least one of the plenum outlets lies between the at least two spools.

12. The dishwasher of claim 11 wherein more than one of the multiple plenum outlets lies between the at least two spools.

13. A dishwasher for treating dishes according to an automatic cycle of operation, comprising:

a tub at least partially defining a treating chamber;

at least one sprayer configured to emit a corresponding spray of liquid into the treating chamber;

at least one liquid circuit supplying liquid to the at least one sprayer;

a pump having a pump inlet fluidly coupled to the treating chamber and a pump outlet; and a diverter valve having a plenum with a plenum inlet coupled to the pump outlet, at least one plenum outlet fluidly coupled to the at least one liquid circuit, and a membrane strip located within the plenum and having at least one control opening and having at least one spool about which the membrane strip is wound or unwound during movement of the membrane strip; and wherein the membrane strip is movable in the plenum for movement along a path overlying the at least one plenum outlet such that the membrane strip can be selectively moved so as to selectively align the at least one control opening with the at least one plenum outlet to selectively enable liquid flow from the plenum inlet through the at least one plenum outlet to control a flow of liquid from the pump to the at least one sprayer.

14. The dishwasher of claim 13 wherein the at least one spool comprises a sprocket and the membrane strip comprises holes that receive the sprocket.

15. The dishwasher of claim 13, further comprising a drive motor having an output shaft operably coupled to the at least one spool.

16. The dishwasher of claim 13 wherein the at least one spool comprises at least two spools, with the membrane strip being continuous and having opposing ends and each end supported about a corresponding one of the at least two spools.

17. The dishwasher of claim 16 wherein the at least two spools are spaced from each other.

18. The dishwasher of claim 17 wherein there are multiple plenum outlets and at least one of the plenum outlets lies between the at least two spools.

19. The dishwasher of claim 18 wherein more than one of the plenum outlets lies between the at least two spools.

20. A dishwasher for treating dishes according to an automatic cycle of operation, comprising:

a tub at least partially defining a treating chamber;

at least one sprayer configured to emit a corresponding spray of liquid into the treating chamber;

at least one liquid circuit supplying liquid to the at least one sprayer;

a pump having a pump inlet fluidly coupled to the treating chamber and a pump outlet; and a diverter valve having a plenum with a plenum inlet coupled to the pump outlet, at least one plenum outlet fluidly coupled to the at least one liquid circuit, and a planar membrane strip located within the plenum; and wherein the planar membrane strip is movable in the plenum for movement along a linear path overlying the at least one plenum outlet such that the planar membrane strip can be selectively moved so as to selectively align least one control opening with the at least one plenum outlet to selectively enable liquid flow from the plenum inlet through the at least one plenum outlet to control a flow of liquid from the pump to the at least one sprayer.

* * * * *